July 8, 1924.

A. HENDRICKS 1,500,387

MOTOR VEHICLE WHEEL CONSTRUCTION

Filed Dec. 31, 1921  3 Sheets-Sheet 1

Inventor
Augustin Hendricks.
By Frank E. Liverance, Jr.
Attorney.

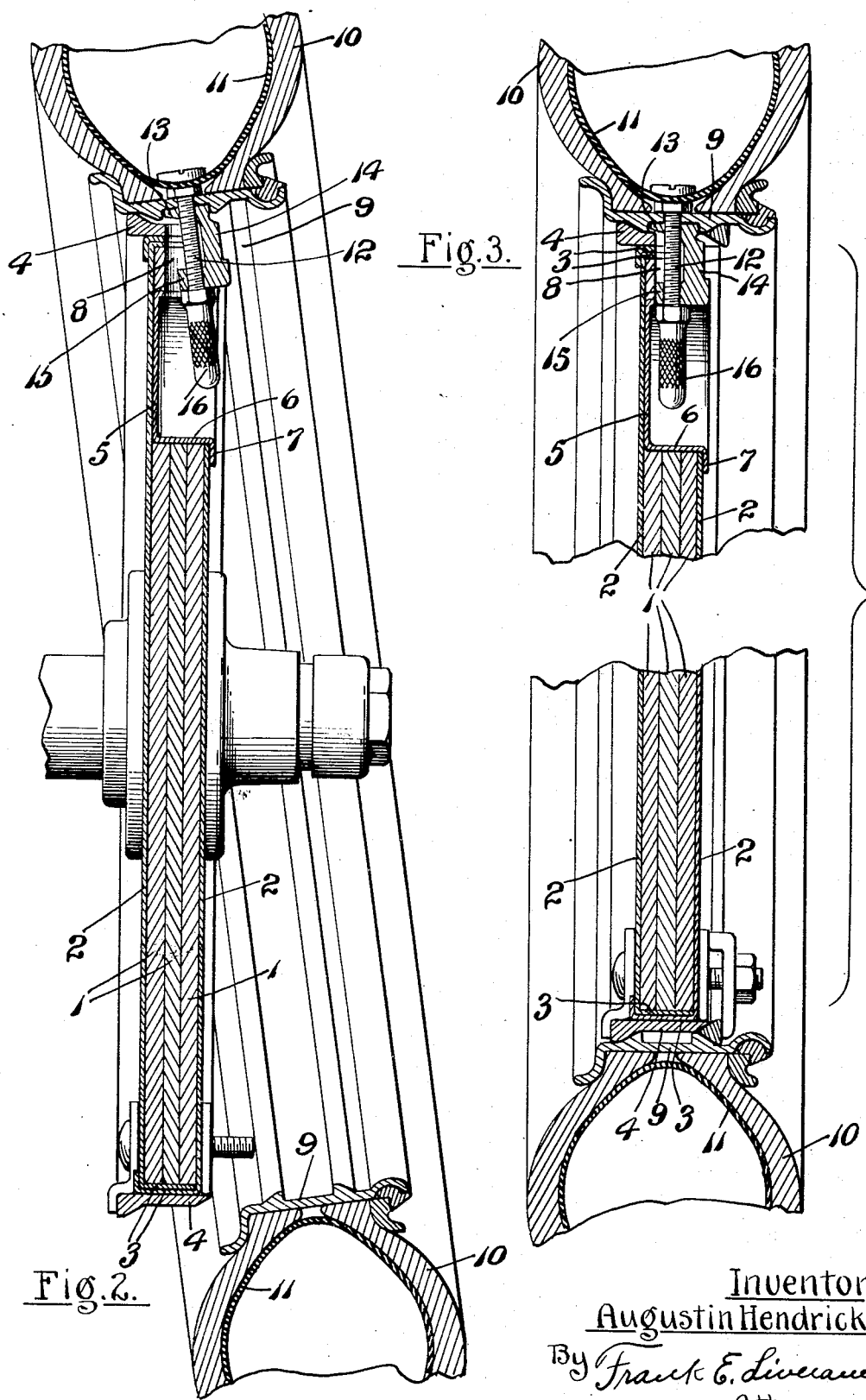

July 8, 1924.

A. HENDRICKS 1,500,387

MOTOR VEHICLE WHEEL CONSTRUCTION

Filed Dec. 31. 1921  3 Sheets-Sheet 3

Inventor
Augustin Hendricks
By Frank E. Liverance, Jr.
Attorney.

Patented July 8, 1924.

1,500,387

UNITED STATES PATENT OFFICE.

AUGUSTIN HENDRICKS, OF GRAND RAPIDS, MICHIGAN.

MOTOR VEHICLE WHEEL CONSTRUCTION.

Application filed December 31, 1921. Serial No. 526,271.

*To all whom it may concern:*

Be it known that I, AUGUSTIN HENDRICKS, a citizen of the United States of America, residing at Grand Rapids, in the county of Kent and State of Michigan, have invented certain new and useful Improvements in Motor Vehicle Wheel Constructions; and I do hereby declare the following to be a full, clear, and exact description of the invention, such as will enable others skilled in the art to which it appertains to make and use the same.

This invention relates to wheels for vehicles, particularly motor vehicles, and is concerned more especially with wheels and demountable rims therefor, the usual pneumatic tire for the wheel being carried by the rim. The invention has relation to and is adapted to be used with the wheel of my invention on which I have heretofore obtained United States Patent No. 1,322,693, issued Nov. 25, 1919. Such wheel is made of a laminated wood core encased and wholly covered with sheet metal to preclude entrance of moisture or other elements which would tend to injure the wood core.

In the present invention it is designed that many improvements may be made in the manner of attaching a demountable rim carrying a tire to a wheel of such construction. Many of the improvements, moreover, are adapted for application to other types of wheels, and the invention is not to be considered as restricted in all respects to disk wheels of the particular type noted. In the attachment of demountable rims to wheels, it is necessary to provide a driving stud on the rim to engage with the wheel to prevent creeping or other change of position of the rim on the wheel which would break the inner air carrying tube of the tire on the rim by reason of the strain imposed on the valve therefor. In addition, in placing a rim on a wheel or in taking it off, it is necessary to swing the side of the rim opposite that at which the valve is located outwardly a distance sufficient to disengage the rim from the wheel at such side and then move the rim bodily outward so as to take the valve outwardly through the opening through the felloe of the wheel, it being evident that prior to this operation, the dust cap must be removed from the valve stem and the nut threaded on the stem against the inner side of the felloe must also be removed. All of these necessary operations not only take considerable time but are troublesome and many times cause annoyance in rim removing or replacing, particularly when the space one has in which to work is restricted, as where the fenders over the wheels are brought close to the tires on said wheels, as required for the design of many types of vehicle bodies now in use.

My invention eliminates all of these disadvantages. No auxiliary driving stud is needed on the rim. There is no need for removal of the dust cap, the dust nut and washer thereon with consquent liability of loss, nor is there any need of lifting the rim and attached tire and moving it to carry the valve stem outwardly through a felloe opening made therefor. In addition, my invention furnishes a very strong reinforce for the valve stem and insures that it shall be rigidly held at all times in proper position radially with respect to the tire and never permitted to tilt to one side at an angle so as to make a pinching of the air tube adjacent the connection of the valve stem thereto likely to happen. The present invention attains all of these objects and purposes in a very simple, practical and economical manner, as well as many others not at this time specifically stated but which will appear fully as understanding of the invention is had from the following description, taken in connection with the accompanying drawings, in which, Fig. 1 is a fragmentary perspective view of the wheel and rim of my invention, showing the same separated but in position to be joined together.

Fig. 2 is a vertical section through the wheel and rim, showing the rim in the act of applying it to the wheel.

Fig. 3 is a similar section with parts broken away, showing the rim attached to the wheel.

Like reference characters refer to like parts in the different figures of the drawings.

Figure 1:
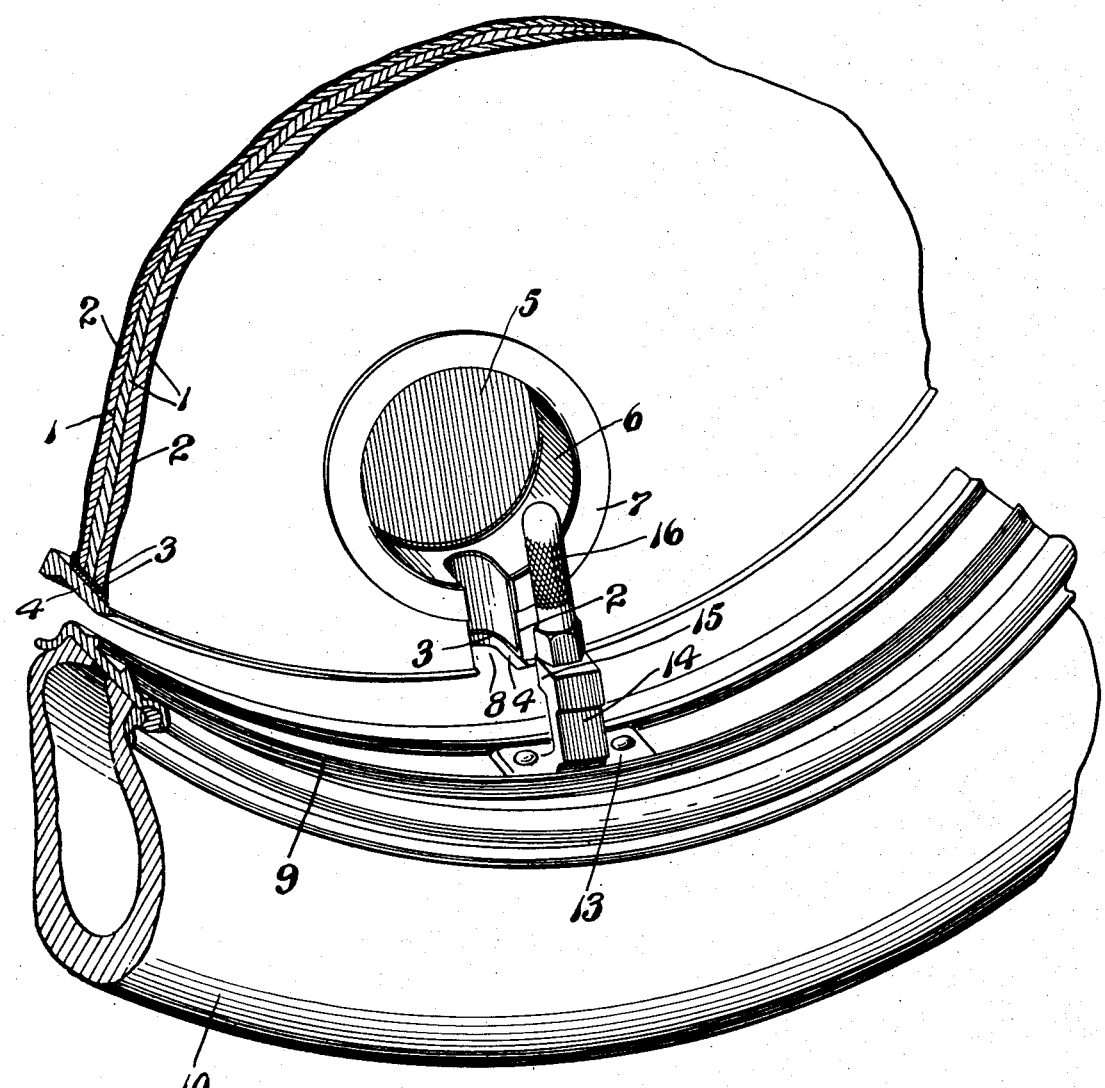
Figure 4:
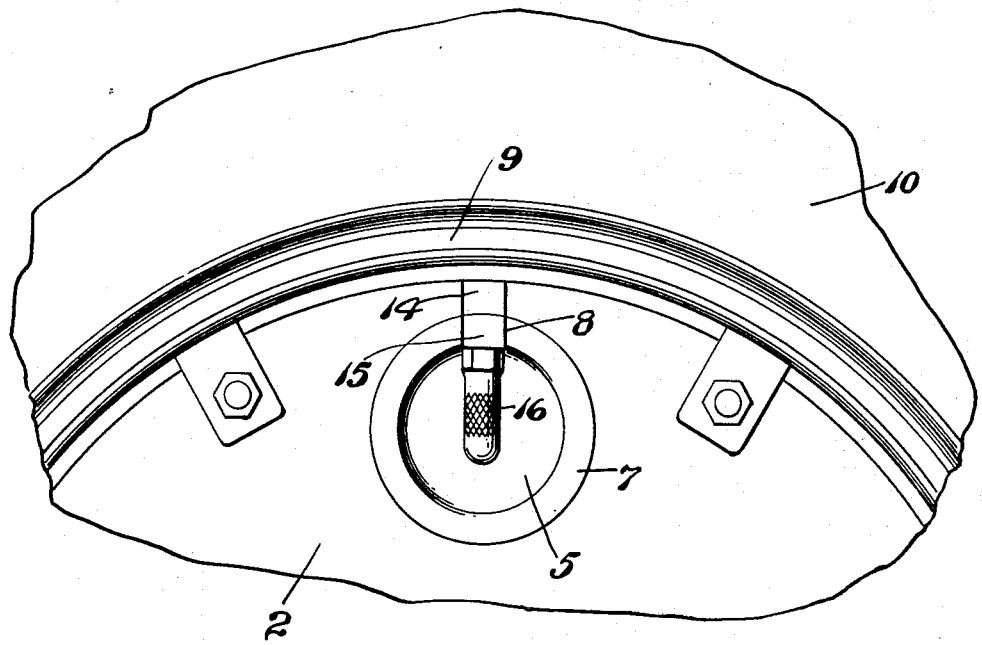
Fig. 4 is a fragmentary side elevation of the connected wheel and rim showing the portion where the air valve is located.
Figure 5:
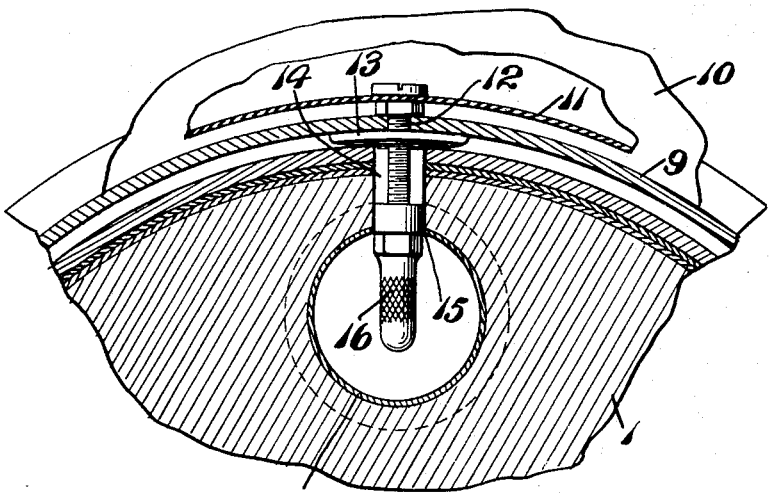
Fig. 5 is a fragmentary vertical section taken through the wheel and connected rim between the sides thereof and in a plane parallel to the sides of the wheel.
Figure 6:
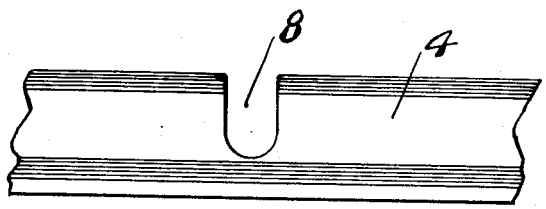
Fig. 6 is a fragmentary plan view looking at the upper edge of the wheel and showing the recess made for the reception of the combined valve stem support and driving member.

The wheel has an inner core of wood made up, preferably of a plurality of disks 1 of wood glued together to make a solid body or disk, the same as fully described in my prior patent to which reference has been made. The central core or disk of wood veneer is encased in sheet metal, having sides 2 which lie against the outer sides of the outer disks 1 of the core, and annular flanges 3 turned toward each other, one passing under the other and both passing around the outer circumferential edges of the core. Adjacent one edge of the disk wheel thus made a circular recess is made in the core and an opening made through the front side 2 of the covering for the core. A metal band 4 is placed around and properly shrunk on or otherwise firmly connected to the wheel.

A shallow cup-like member is located in the recess made in the core and through the opening made in the front side 2 of the covering, having a bottom 5, sides 6, and an annular outturned flange 7 at the outer edges of the sides 6. This member is of drawn steel, the bottom 5 coming against the rear side 2 of the covering and being attached thereto as by spot welding or riveting, while the flange 7 lies against the outer side of the front side 2 of the sheet metal wheel covering and is similarly attached thereto, thus holding the two rigidly together and reinforcing the wheel at the point where a slot or recess is cut inwardly from the front side of the wheel through the band 4, flanges 3, the portions of the disks 1 and the side 6 of the cup-like reinforcing member nearest the band, the flange 7 and the front side 2 being likewise cut away in forming the recess. This recess, indicated at 8, extends from the front side of the wheel nearly to the back thereof and is positioned between the cup-like reinforcing member and the adjacent peripheral edge of the wheel. The wheel is completed by the usual hub and rim connecting studs, shown in the drawings but not particularly described as the same are no essential feature of the present invention.

The rim 9, outer tire casing 10 thereon, and inner air tube 11 are of conventional and well known construction. The valve stem 12 in which the usual air valve is located is attached in well known manner to the inner tube 11 and passes through the rim 9. A fixture is secured to the rim at the point of passage of the valve stem therethrough, comprising a base 13 permanently connected to the under side of the rim and through which the stem 12 passes, a somewhat forwardly off-set post 14 and a rearwardly extending integral lug 15 at the upper end of the post, having an opening through which the stem 12 also passes. The usual dust cap 16 may be threaded on to the valve stem and engage against the lug.

In placing the rim with attached tire on the wheel, it is necessary merely to position the rim with the valve stem 12 and the fixture associated therewith opposite the recess at 8, as shown in Fig. 2, move such portion of the rim over the band 4 to enter the valve stem and fixture into the recess, and then swing the lower side of the rim to place on the wheel, thereafter placing the securing nuts on the attaching studs for holding the rim on the wheel. The removal is accomplished quite as easily, merely reversing the order of the operations.

It will be noted that the dust cap does not have to be removed, there is no bodily lifting of the rim and attached tire needed with other constructions to disengage the valve stem from the wheel, and that there are no parts to remove and put by for a time, later to be attached in place. It is also evident that the post 14 of the fixture fitting comparatively snugly in the recess 8 and engaging with the sides of the recess serves as a driving stud for the rim which cannot change position on the wheel. The valve stem passing through the base 13 and lug 15 is held firmly from tilting or changing position with respect to the air tube 11 and there can be no injury to the tube from buckling or pinching thereof coming from tilting of the stem. It is to be noted that in the usual type of wheels having detachable rims, the hole for passing the valve stem through the rim and felloe of the wheel has to be made considerably larger in diameter than the diameter of the valve stem in order to permit the tilting action necessary when the rim with its attached tire and valve stem is put on or removed from the wheel. Accordingly, if the tire becomes wholly or partly deflated, the wheel revolving and carrying its load, a tilting of the valve stem occurs by reason of the tendency of the inner tube to creep within the casing under such conditions. This tilting of the valve stem causes a pinching or chewing action on the inner tube between the metal attaching parts of tilted stem and the outer casing, almost immediately cutting or chewing the inner tube at such points. This is more pronounced if the nut usually threaded on to the valve stem against the felloe is left off, as frequently occurs. With my construction, there can be nothing of this character occur. The opening for the passage of the valve stem in the post is but a few thousandths of an inch larger in diameter than the diameter of the stem. There can be no tilting of the stem, irrespective of whether or not the nut is used, though, as a matter of fact, the nut is practically always in place as it seldom has to be removed, as in changing rims with ordinary forms of demountable rims. The stem remains perpendicular to the tube, even though the tire is wholly deflated, permitting considerable movement of the vehicle without injury to the inner tube from the above described source. The outer sides of post 14 and lug 15 conform to and lie flush with the adjacent portions of the front side 2 of the covering of the wheel and of the flange 7 so that a smooth and unbroken surface is presented, no detrimental change in appearance occurring. The dust cap is housed and protected from injury within the cup-like member and the valve is accessible from the front or outer side of the wheel, this being a feature of especial importance and value with wheels of the disk type. In fact, the invention has these features of merit to full degree and withal is economically produced, is strong and durable and efficient in every way. Practically no space over the tire is required for the attachment or removal of the rim and tire, permitting the fenders to be placed very low with respect to the wheels for certain models and styles of body design. The post 14 stops the passage of dust to the valve stem from which it might pass through the base 13 and rim 9 into the tire with detrimental effect, and the dust cap 16 may be of shorter length, or at least need not be threaded onto the valve stem as far as now required.

The invention is defined in the appended claims and I consider myself entitled to all forms of structure coming within their scope.

I claim:

1. In combination, a wheel rim, a tire casing thereon, an air tube within the casing, a valve stem attached to the tube and passing through the rim, and a member comprising a base having an opening to receive the valve stem, a radially extending post from the base at one side thereof and a lug at the outer end of the post, said base being permanently secured to the rim, and said stem passing through the base and lug.

2. In combination, a wheel rim, a tire casing thereon, an air tube within the casing, a valve stem attached to the tube and passing through the rim, a fixture connected to the rim comprising a base permanently secured to the rim and through which said stem passes, an off-set post located in front of and substantially paralleling the valve stem, and a lug extending back over the base at a distance therefrom, the valve stem also passing through the lug, substantially as described.

3. In combination, a wheel having a radial recess adjacent one edge and at one side of the wheel, said recess extending to the outer edge of the wheel, a rim demountably attached to the wheel, a tire casing on the rim, an air tube within the casing, a valve stem attached to the tube and passing through the rim, and a member attached to the rim and engaging with the stem at the ends thereof and spaced from the stem between the ends of the same, said stem passing therethrough, said member filling the recess made in the wheel, substantially as described.

4. In combination a wheel comprising a disk and provided with a radial recess in one side and at one edge of the wheel, said recess extending inwardly for a short distance from the outer edge of the wheel, a rim demountably attached to the wheel, a tire casing on the rim, an air tube within the casing, a valve stem projecting from the tube and located in said recess whereby the stem may be removed from the wheel by outward movement away from the face of the wheel when the rim is detached and means carried by the rim and bracing the valve stem at the end thereof and spaced from the valve stem between the ends of the same.

5. In combination, a wheel comprising a disk provided with a radial recess in one side and at one edge of the wheel, said recess extending inwardly for a short distance from the outer edge of the wheel, a rim demountably attached to the wheel, a tire casing on the rim, an air tube within the casing, a valve stem projecting from the tube and located in the recess, and a member attached to the rim and located in the recess to provide a driving stud connection between the rim and wheel, said member having a terminal portion engaging the valve stem, the member being spaced from the stem adjacent the terminal portion.

6. In combination, a rim adapted to be demountably attached to a wheel, a tire casing on the rim, an air receiving tube within the casing, a valve stem attached to the tube and passing through the rim, and a post attached to the rim and extending radially therefrom at one side of the valve stem and having a terminal portion through which the valve stem passes, substantially as described.

7. In combination, a rim adapted to be demountably attached to a wheel, a tire casing on the rim, an air receiving tube within the casing, a valve stem attached to the tube and passing through the rim, a post secured at one end to the rim and extending radially therefrom, said post being provided with a laterally projecting lug having an opening through which the valve stem passes slightly larger in diameter than the diameter of the stem, the stem extending beyond the post, substantially as described.

8. In combination, a rim adapted to be detachably connected to a wheel, a tire casing on the rim, an air receiving tube within the casing, a valve stem attached to the tube and passing through the rim, a post secured at one end to the rim and extending radially therefrom, said post being provided with a laterally projecting terminal portion having an opening through which the stem passes whereby the stem is held perpendicular to the tube, and means detachably threading on to the end of the stem against the outer end of the post.

In testimony whereof I affix my signature.

AUGUSTIN HENDRICKS.